US007426938B2

(12) United States Patent
Bohaychuk et al.

(10) Patent No.: US 7,426,938 B2
(45) Date of Patent: Sep. 23, 2008

(54) CHOKE VALVE FLOW TRIM FOR FRACTURE PREVENTION

(75) Inventors: Larry J. Bohaychuk, Ardrossan (CA); Loren Kowalchuk, Edmonton (CA); Patrick Rabby, St. Albert (CA); Chad Dannish, Edmonton (CA)

(73) Assignee: Master Flo Valve Inc., Edmonton (CA)

( * ) Notice: Subject to any disclaimer, the term of this patent is extended or adjusted under 35 U.S.C. 154(b) by 0 days.

(21) Appl. No.: 11/334,047

(22) Filed: Jan. 18, 2006

(65) Prior Publication Data

US 2006/0163517 A1   Jul. 27, 2006

Related U.S. Application Data

(60) Provisional application No. 60/715,914, filed on Sep. 9, 2005, provisional application No. 60/644,670, filed on Jan. 18, 2005.

(51) Int. Cl.
*F16K 3/24* (2006.01)
*F16K 47/14* (2006.01)

(52) U.S. Cl. .................... 137/625.33; 251/118
(58) Field of Classification Search .............. 137/625.3, 137/625.33, 625.37, 625.38; 251/118
See application file for complete search history.

(56) References Cited

U.S. PATENT DOCUMENTS

| | | | | |
|---|---|---|---|---|
| 3,813,079 A | * | 5/1974 | Baumann et al. | 251/127 |
| 4,004,613 A | * | 1/1977 | Purton et al. | 137/625.3 |
| 4,109,683 A | * | 8/1978 | Strache | 137/625.3 |
| 4,540,022 A | | 9/1985 | Cove et al. | |
| 4,569,370 A | * | 2/1986 | Witt | 137/625.3 |
| 4,679,592 A | * | 7/1987 | Lamb | 137/625.33 |
| 4,802,621 A | * | 2/1989 | Standke | 236/93 R |
| 4,860,993 A | * | 8/1989 | Goode | 251/127 |
| 5,020,571 A | * | 6/1991 | Tartaglia et al. | 137/625.3 |
| 5,080,128 A | | 1/1992 | Taylor | |
| 5,431,188 A | | 7/1995 | Cove | |
| 5,623,966 A | | 4/1997 | Rodger | |
| 5,706,856 A | * | 1/1998 | Lancaster | 137/556.3 |
| 6,105,614 A | | 8/2000 | Bohaychuk et al. | |
| 6,782,949 B2 | | 8/2004 | Cove et al. | |
| 6,886,598 B2 | | 5/2005 | McCulloch | |
| 7,025,140 B2 | | 4/2006 | McGee | |

FOREIGN PATENT DOCUMENTS

GB   2 351 140 A   12/2000

* cited by examiner

*Primary Examiner*—John Fox
(74) *Attorney, Agent, or Firm*—Greenlee Winner and Sullivan PC (57) ABSTRACT

A choke valve having flow trim components, namely a tubular cage and a flow collar or plug, and related components, designed and arranged for reduced fracturing. The invention includes a protective tubular sleeve, or insert cartridge in which the side ports are located to overlap with the intersection of axes of the inlet and outlet bores, but to avoid direct impingement of fluid along the axis of the inlet bore. In the cage, at least a pair of main flow ports are located to overlap with the intersection of the axes of the inlet and outlet bores, and are aligned with the side ports of the tubular sleeve or cartridge to communicate directly with the side ports. In this manner fluid may enter the choke valve through the inlet bore and pass through the main flow ports at reduced pressure and continue out through the outlet bore, without direct impingement on the side wall of the flow trim components.

13 Claims, 5 Drawing Sheets

CHOKE VALVE FLOW TRIM FOR FRACTURE PREVENTION

CROSS REFERENCE TO RELATED APPLICATIONS

This application claims priority under 35 U.S.C. 119(e) from U.S. Provisional Patent Application No. 60/644,670 filed Jan. 18, 2005 and U.S. Provisional Patent Application No. 60/715,914 filed Sep. 9, 2005. To the extent that it is consistent herewith, the aforementioned applications are incorporated herein by reference.

BACKGROUND OF THE INVENTION

The present invention relates to a flow trim for use in a choke valve for preventing or reducing fracturing of flow trim choke components.

A choke valve is provided on the production wellhead to provide controlled production of an oil or gas reserve. By controlling the orifice through the valve, a pressure drop and flow rate is controlled to ensure the well is produced in a manner to maximize production output, meet production quotas, minimize sand or solid production and ensure the formation is not damaged through the process. The manner in which production reserve is produced and managed can significantly affect the quantity of the reserve.

A problem that has produced many production interruptions both with surface and subsea facilities is the failure of valve trim due to fracture. The common causes of this fracture mechanism are foreign debris moving through the flow line into the valve with sufficient mass and velocity to damage or fracture the valve trim or the effect of liquid slugs in a high velocity gas phase entering the valve inlet. Choke valve trim is typically manufactured from tungsten carbide material. This material is a powder metallurgy product where tungsten in the concentration of about 85-95% is bonded within a matrix with a binder material, typically nickel, cobalt, molybdenum, chromium or a combination of these elements in the concentration of about 5-15%. This produces a material that is very hard by nature to prevent or delay the effects of erosion to the valve trim. The hardness of the trim components is typically in the Rockwell Ra 90-95 range. A negative trait of the tungsten carbide material matrix is the susceptibility to fracture due to impact damage.

There have been a number of attempts at solutions to mitigate the damage caused by foreign debris; however, many of these attempts have resulted in a trade off to the potential wear capabilities of the choke trim. Two such solutions are described below.

1. Some choke valve manufacturers have adopted a standard to select tungsten carbide Grades that have a higher percentage of binder material typically nickel, cobalt, molybdenum, chromium or a combination of these elements. Concentrations in the order of 12-15% have resulted in improved toughness of the tungsten carbide matrix; however, the volume of binder in the concentration results in a matrix with lower hardness and consequently substandard erosion characteristics. This results in rapid wear to the flow trim resulting in costly production interruptions for valve maintenance or in the subsea applications, a high valve retrieval cost to facilitate maintenance.

2. Another option used by some choke valve manufacturers is to encase the tungsten carbide material with a stainless steel carrier, thereby absorbing some of the energy from the foreign particle on impact and protecting the brittle tungsten carbide from direct impact. A negative consequence of this commonly known "plug and cage trim" design is that in order to encase the tungsten carbide in a stainless steel carrier, a valve design must incorporate an internal plug, in a design commonly referred to an internal plug cage style trim. In this way, the tungsten plug material travels inside the cage protected from impact. The tungsten carbide material required to resist wear to the cage is protected by a stainless steel carrier. This internal plug design has proven inferior for erosion resistance when compared to the external sleeve (flow collar) choke valve designs.

External sleeve flow trim designs for choke valves are generally described in the prior art, see for instance U.S. Pat. No. 4,540,022, issued Sep. 10, 1985, to Cove et al., and U.S. Pat. No. 6,105,614, issued Aug. 22, 2000 to Bohaychuk et al. A choke valve including an external sleeve flow trim in subsea applications is shown in U.S. Pat. No. 6,782,949 to Cove et al. (see FIG. 1 prior art). These patents describe the beneficial characteristics of the external sleeve (flow collar) design in erosion control, valve outlet erosion protection, seating integrity, and fluid energy control features.

SUMMARY OF THE INVENTION

The invention relates to a choke valve having flow trim components, namely a tubular cage and a flow collar or plug, and related components, designed and arranged for reduced fracturing.

The following features of the present invention are most preferably adopted:

1. a hard tungsten carbide trim material for maximum erosion resistance;

2. an external sleeve cage trim design for optimum fluid handling attributes including erosion control, outlet protection and seating integrity; and 3. protection for the flow trim to prevent or reduce fracture of the brittle tungsten carbide flow trim from direct impact damage of foreign particles or high velocity liquid slugs entering the valve inlet. In preferred embodiments, this involves offsetting ports in a deflecting sleeve or insert cartridge relative to the axis of the inlet, to avoid direct impingement of fluid from the inlet in the areas of the ports.

According to one aspect of the invention, there is provided a choke valve having a fluid flow path extending therethrough which is to be restricted or closed, including the following:

a hollow valve body assembly having an inlet bore and an outlet bore substantially at right angles and a main bore which is an extension of the outlet bore and which communicates with the inlet bore;

a tubular sleeve positioned in the main bore across the inlet bore and forming a pair of diametrically opposed side ports communicating with the inlet bore, the side ports being located to overlap the intersection of the axes of the inlet and outlet bores, but to avoid direct impingement of fluid along the axis of the inlet bore;

a flow trim comprising a stationary tubular cage aligned with the body outlet, and a flow collar or plug (the flow collar being preferable) slidable along the side wall of the cage, the cage side wall forming an internal bore aligned with the outlet bore and at least a pair of diametrically opposed main flow ports located to overlap the intersection of the axes of the inlet and outlet bores, the main flow ports being aligned with the side ports of the tubular sleeve to communicate directly with the side ports, whereby fluid may enter the choke valve through the inlet bore and pass through the main flow ports at reduced pressure and continue through the outlet bore;

a bonnet connected with and closing the upper end of the tubular sleeve and the body, the bonnet being disengagably connected with the body; and a stem for biasing the flow collar or plug over the main flow ports.

In a preferred embodiment, such as for subsea applications, the choke valve of this invention is modified such that the tubular sleeve and the flow trim are arranged as a removable insert assembly positioned in an insert chamber formed between the inlet and outlet. The insert assembly thus includes:

i. a tubular cartridge having a side wall forming an internal bore and a pair of diametrically opposed side ports communicating with the body inlet, whereby fluid enters through the side ports from the body inlet, the side ports being located to overlap the intersection of the axes of the body inlet and the body outlet, but to avoid direct impingement by fluid moving along the inlet axis from the body inlet;

ii. the flow trim positioned in the cartridge internal bore, the flow trim comprising the tubular cage aligned with the body outlet, and the flow collar or plug (the flow collar being preferable) slidable along the side wall of the cage, the cage side wall forming the pair of diametrically opposed main flow ports located to overlap the intersection of the axes of the inlet and outlet, and aligned with the side ports of the tubular cartridge to communicate directly with the side ports, whereby fluid from the inlet may enter the cage bore at reduced pressure and pass through the outlet;

iii. the bonnet connected with and closing the upper end of the tubular cartridge and the body, the bonnet being disengagably connected with the body; and iv. the stem for biasing the flow collar or plug over the main flow ports.

Preferably, the main bore or insert chamber of the choke valve is diametrically enlarged to reduce the flow velocity substantially compared to the flow velocity in the body inlet, thereby reducing the kinetic energy contained by a foreign particle.

In another broad aspect of this invention, the choke valve is modified with protuberances to maximize erosion resistance and fluid handling attributes and to further protect choke components, particularly the flow trim. In this preferred embodiment, the choke valve includes at least a pair of diametrically opposed secondary flow ports formed in the side wall of the cage, the secondary flow ports having a smaller diameter than that of the main flow ports and each pair of secondary flow ports being positioned with an axis which is offset by 90° from the axis of the main flow ports and closer to the body outlet than are the main flow ports. The protuberances are formed extending inwardly into the tubular sleeve or cartridge internal bore from the side wall of the tubular sleeve or cartridge and aligned with each of the secondary flow ports, so that fluid moving through an annulus formed between the flow trim and tubular sleeve or cartridge is deflected inwardly by the protuberances to enter the cage through the secondary flow ports. The protuberances are preferably of a length which at least spans the diameter of the secondary flow ports, and have inwardly tapered side walls.

The invention also broadly extends to components of the choke valve of the present invention, including the removable insert and the flow trim components (i.e., cage and flow collar or plug).

According to another aspect of the invention, there is provided a removable insert assembly for use in a choke valve having a fluid flow path extending therethrough which is to be restricted or closed, said choke valve including a hollow valve body assembly having an inlet bore and an outlet bore arranged in a T-shape, to provide a body side inlet, a body outlet and an insert chamber at the intersection of the inlet and outlet, the insert assembly being capable of being positioned in the insert chamber, and comprising:

i. a tubular cartridge having a side wall forming an internal bore and a pair of diametrically opposed side ports communicating with the body inlet, whereby fluid enters through the side ports from the body inlet, the side ports being located to overlap the intersection of the axes of the body inlet and the body outlet, but to avoid direct impingement by fluid moving along the inlet axis from the body inlet;

ii. a flow trim positioned in the cartridge internal bore, the flow trim comprising a tubular cage aligned with the body outlet, and a flow collar or plug (the flow collar being preferable) slidable along the side wall of the cage, the cage side wall forming at least a pair of diametrically opposed main flow ports located to overlap the intersection of the axes of the inlet and outlet, and aligned with the side ports of the tubular cartridge to communicate directly with the side ports, whereby fluid from the inlet may enter the cage bore at reduced pressure and pass through the outlet;

iii. a bonnet connected with and closing the upper end of the tubular cartridge and the body, the bonnet being adapted to be disengagably connected with the body; and iv. a stem extending through the bonnet for biasing the flow collar or plug over the main flow ports.

Preferably, the removable insert includes the secondary flow ports and protuberances as above described.

Preferably the choke valve or removable insert assembly of this invention includes only one pair of main flow ports and only one pair of secondary flow ports, and the side ports of the tubular sleeve being positioned with an axis which is offset by 90° relative to the axis of the inlet.

DESCRIPTION OF THE PREFERRED EMBODIMENT

Figure 1:
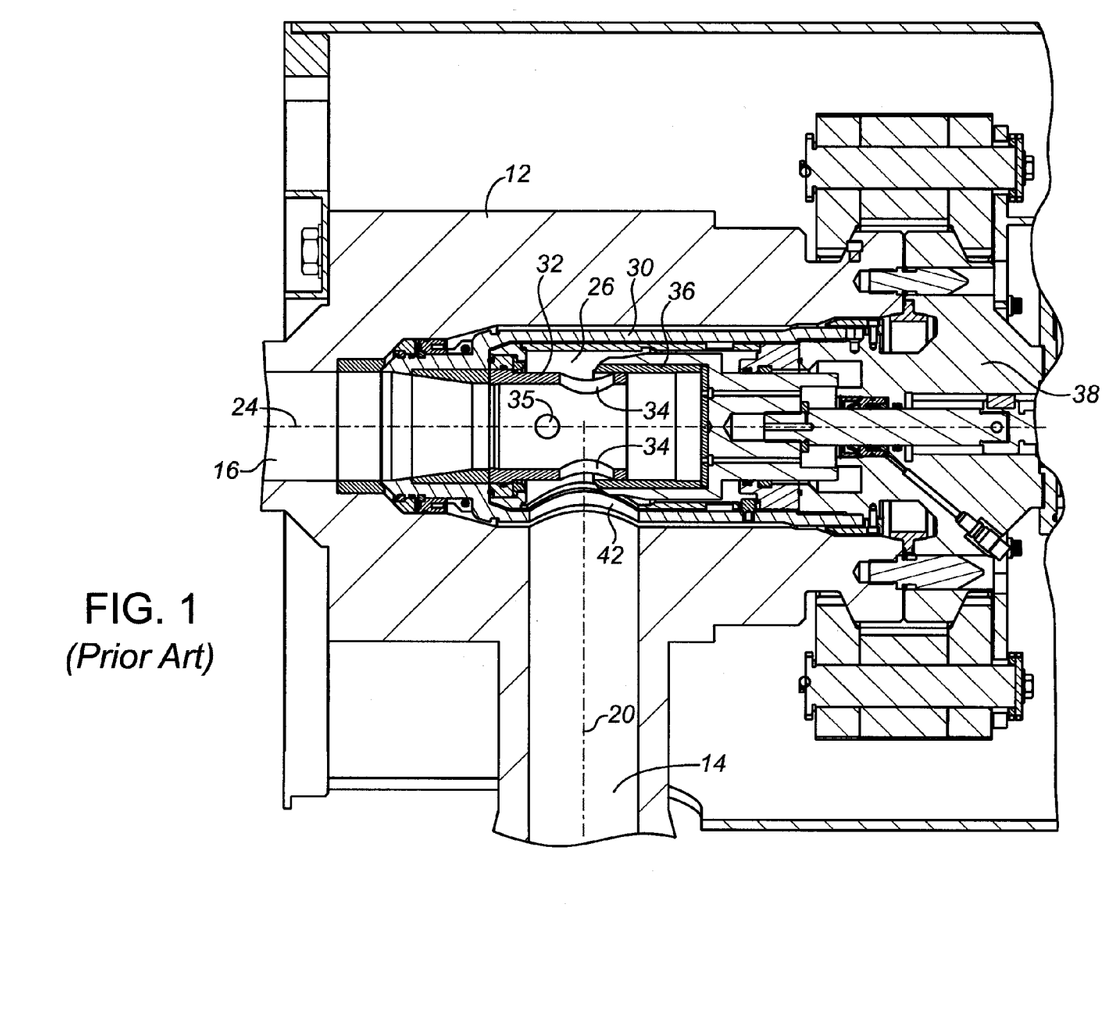
FIG. 1 is a side sectional view of a subsea choke valve of the prior art showing an insert cartridge having both the side port of the insert cartridge and the main flow ports of the cage aligned with the inlet.

Preferred embodiments of the choke valve of the present invention are illustrated in FIGS. 2-5 to be of the internal cage, external sleeve or flow collar design, within a insert assembly such as is useful in subsea applications. To best contrast the invention, a prior art choke similar to that of U.S. Pat. No. 4,540,022 is shown in FIG. 1, with like elements being similarly numbered in all of the Figures.

Figure 2:
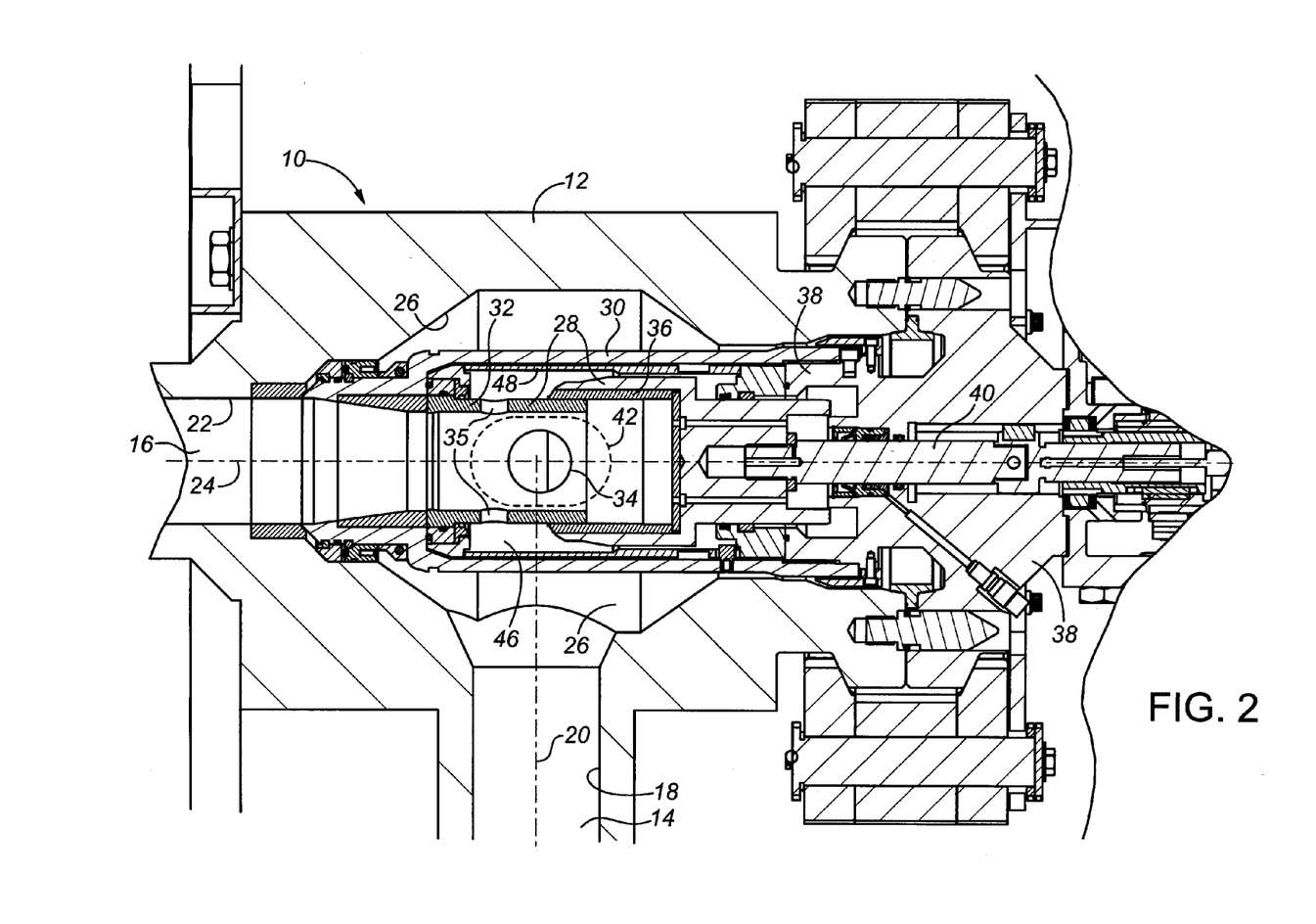
FIG. 2 is a side sectional view of the choke valve of the present invention, in which the side ports of the insert cartridge (dotted outline), and the main flow ports of the cage (solid lined port within the dotted port outline) are shown to be 90° offset from the inlet.

Turning to FIG. 2, the choke valve of the invention is generally shown at 10 to include a hollow valve body 12, body inlet 14 and body outlet 16. The hollow valve body 12 forms a bore which extends therethrough providing side inlet bore 18 having an inlet bore axis 20, a bottom outlet bore 22 having outlet bore axis 24. The bores 18, 22 intersect at right angles (i.e., are generally T-shaped), forming a main bore 26 (also termed insert chamber) at the intersection. The main bore or insert chamber 26 is an extension of the outlet bore 22, but which also communicates with the inlet bore 18.

Flow trim components 28 are shown to be located within a removable insert cartridge 30. In general, the flow trim 28 includes a stationary cage 32 which is tubular and substantially open-ended, and a throttling sleeve or flow collar 36. The cage 32 has a side wall which forms an internal bore that communicates and is substantially aligned with the outlet bore 22. The side wall of the cage 32 also forms at least a pair of diametrically opposed main flow ports 34, and preferably at least a pair of diametrically opposed smaller, secondary flow ports 35. The secondary flow ports 35 have a smaller diameter than that of the main flow ports 34, and are positioned with their axis (i.e., an axis through the midpoint of the ports) which is rotated or offset by 90° from the axis of the main flow ports 34. The ports 35 are positioned closer to the body outlet 16 than are the main flow ports 34.

The flow collar 36 is connect to a stem assembly 40 for advancing or withdrawing the flow collar 36 to slide across the ports 34, 35 to close them as required. It is possible to modify the choke valve of this invention to incorporate other suitable throttling members. For example, an internal plug (not shown) may be used to advance within the cage to restrict or close the ports. As mentioned above, the flow trim components are preferably made of an erosion resistant hard material such as tungsten carbide.

The most preferred orientation of the cage 32 within the cartridge 30 is to position the two large main flow ports 34 to overlap with the intersection of the inlet bore axis 20 and the outlet bore axis 24, but rotated or offset (most preferably 90°) relative to the direct impact line along inlet bore axis 20 so as to avoid direct impingement of fluid from the body inlet 14 on the area of the cage 32 surrounding the main flow ports 34. Fluid may enter the choke valve 10 through the inlet bore 18 and pass through the main flow ports 34 at reduced pressure and continue out through the outlet bore 22.

Insert cartridge 30 is shown to consist of a tubular structure housing the flow trim 28 and other valve internals to facilitate separation and containment of the valve internals from the valve body 12 during an insert retrieval in a subsea operation. The insert cartridge 30 surrounds the flow trim 28 (cage 32 and throttling sleeve or flow collar 36). Typically this insert cartridge 30 is disengageably connected at its upper end to a bonnet 38 which closes the cartridge 30, and fit into the valve body 12. The insert cartridge 30 is removably seated and sealed within the valve body 12. A stem 40 extends through the bonnet 38 for biasing the throttling sleeve or flow collar 36 over the main flow ports 34 (and secondary ports 35) so as to throttle fluid flow therethrough. The insert cartridge 30 is formed with a pair of diametrically opposed side ports 42 in its sidewall. The insert cartridge 30 is positioned so that these side ports 42 communicate with the inlet bore 18, being located to overlap the intersection of the axes 20, 24 of the inlet and outlet bores 18, 22 respectively. However, the axis of the side ports 42 is offset, preferably by 90°, relative to the axis 20 of the inlet bore 18, to avoid direct impingement of fluid and any debris moving along the axis 20 of the inlet bore 18. This provides a protective membrane for the flow trim 28 from direct impact from any foreign material or liquid slugging containing sufficient kinetic energy traveling into the body inlet 14 to damage the flow trim 28. The diametrically opposed main flow ports 34, whether as a single pair as shown in the Figures, or as multiple pairs or clusters, are each aligned with the side ports 42 of the cartridge 30 for direct fluid communication.

Fluid traveling into the body inlet 14 thus directly impinges on the side wall of the insert cartridge 30 away from the area of the side ports 42, expelling the energy into the insert cartridge 30 and furthermore into the valve body 12. The components of the flow trim 28 are thus protected against fracturing. The fluid then travels the intended path between the valve body 12 and insert chamber 26. The insert chamber 26 is sized (i.e., diametrically enlarged relative to what it needs to be if the side ports 42 were directly aligned with the inlet bore axis 20) to reduce the flow velocity substantially compared to the flow velocity in the body inlet 14, thereby reducing the kinetic energy contained by a foreign particle. As above stated, the main flow ports 34 are aligned with the side ports 42 to communicate directly with the side ports 42, whereby fluid from the body inlet 14 may enter the cage 32 at reduced pressure and pass through the body outlet 16. The fluid is thus directed through the insert chamber 26 and through the side ports 42, entering the cage 32 through the main flow ports 34. The reason for preferably using four distinct ports (two main flow ports 34 and two secondary flow ports 35 as shown in the Figures) in the cage 32 is that, by aligning the side ports 42 with the larger main flow ports 34 in the cage 32, the velocity in the area between the inner cartridge-outer cage, shown at 46 in FIG. 2, can be minimized, greatly reducing velocity and consequential erosion in this area 46.

The number of side ports 42 equates to a maximum of a pair of diametrically opposed side ports 42. The important feature is that the side ports 42 of the insert cartridge 30 are offset relative to the inlet bore axis 20 to avoid direct impingement at the ports along the inlet bore axis 20. The number of main flow ports 34 and/or secondary flow ports 35 in the cage 32 of the flow trim 28 can vary, but will include at least a pair of diametrically opposed main flow ports 34 aligned with the side ports 42 and located to communicate directly with the side ports 42. The size and configuration of the ports may also vary from the depicted embodiment. A port can be configured as a localized cluster of smaller ports functioning similarly to one larger port. Thus, as used herein and in the claims, the term "port" does not necessarily imply a single port, but may also include a plurality of small, localized ports arranged in a cluster.

In applications not involving an insert cartridge, a protective tubular sleeve (not shown), but similar to the insert cartridge 30 and configured with side ports similarly offset as previously described, can be positioned in the insert chamber 26.

The choke valve of the present invention may be contrasted to the prior art choke valve of FIG. 1. In FIG. 1 the insert cartridge has ports aligned with the inlet, with like parts being labeled similarly to that in FIGS. 2-5. As is evident, the problem set out in the background above, with debris from the inlet being able to strike the flow trim, can occur.

Figure 3:
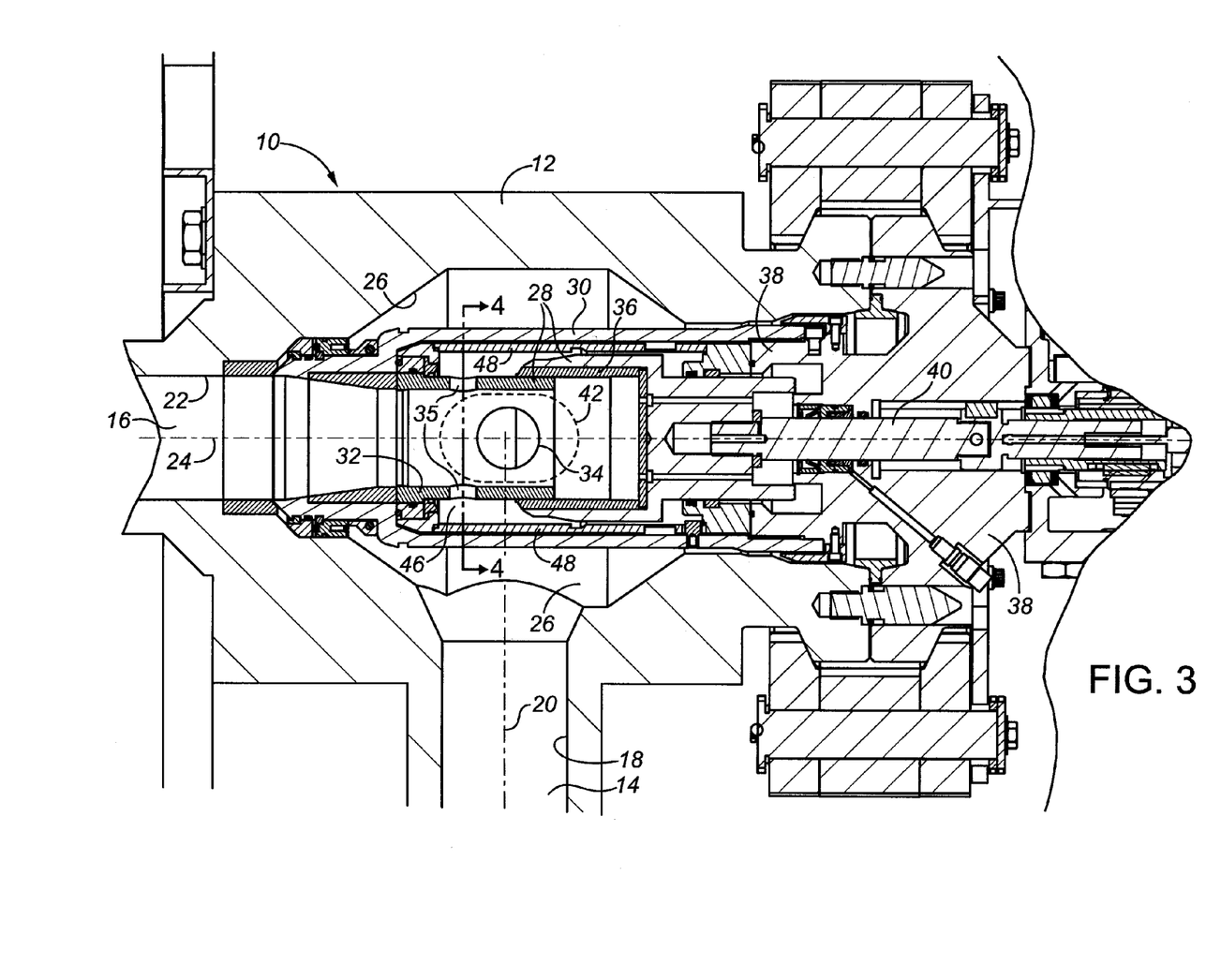
FIG. 3 is a side sectional view of the choke valve of the present invention as in FIG. 2, but showing protuberances aligned with the secondary flow ports of the cage.
Figure 4:
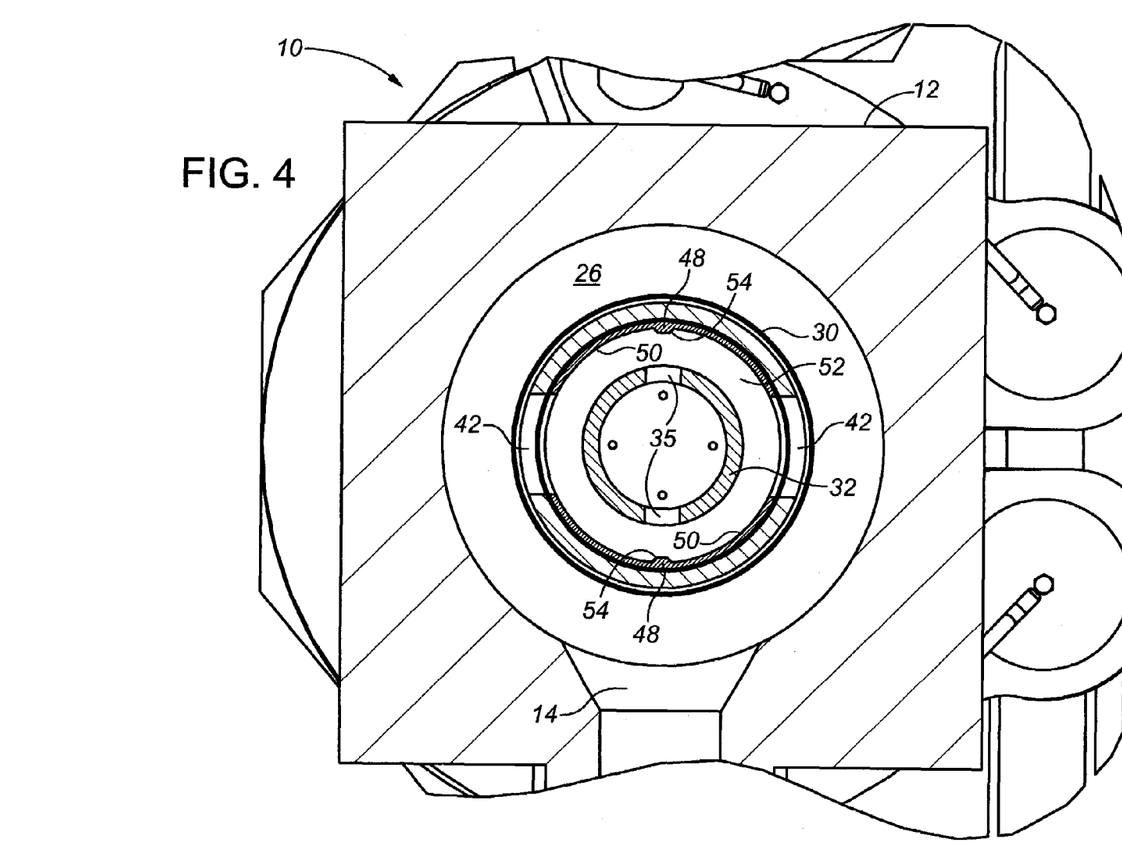
FIG. 4 is a cross-sectional view of the flow trim of the present invention taken through line 4-4 of FIG. 3 and showing the protuberances aligned with the secondary flow ports of the cage and having a length which at least spans the diameter of the secondary flow ports.
Figure 5:
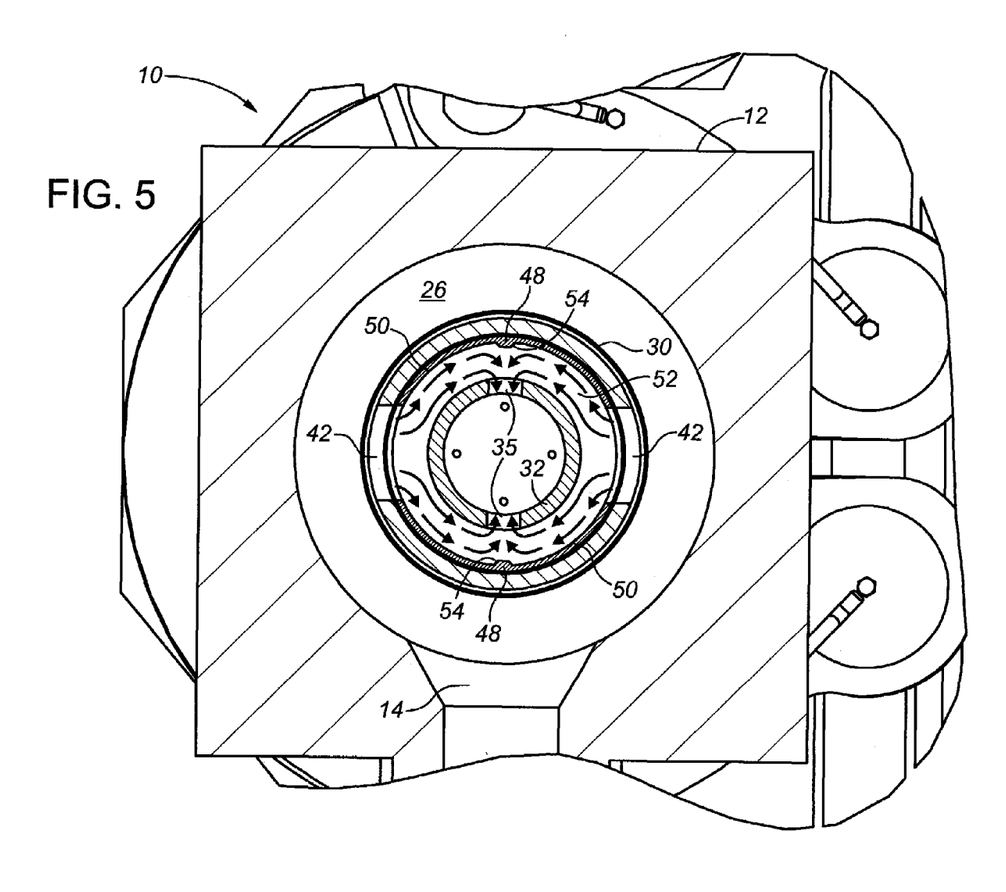
FIG. 5 is a cross-sectional view similar to FIG. 4, with arrows fancifully indicating the flow pattern of the fluid streams.

In a further improvement, the invention preferably includes inwardly extending protuberances 48 on the insert cartridge 30 to deflect flow toward the secondary flow ports 35 of the cage 32. FIGS. 3-5 illustrate a pair of opposed protuberances 48. FIG. 3 shows protuberances 48 aligned with the secondary flow ports 35 of the cage 32 and having a length which at least spans the diameter of the secondary flow ports 35. The protuberances 48 are best shown in the cross sections of FIGS. 4 and 5, extending inwardly into the cartridge internal bore from the side wall of the insert cartridge 30. Specifically, the protuberances 48 are attached to the inner circumferential surface of the tubular liner 50, or are manufactured or cast as part of the tubular liner 50 of the insert cartridge 30. The protuberances 48 are positioned over and substantially in alignment with each of the secondary flow ports 35, but preferably in direct alignment with the secondary flow ports 35, so that fluid moving through an annulus 52 formed between the insert cartridge 30 and the flow trim 28 is deflected inwardly by the protuberance 48 to enter the cage 32 through the secondary flow ports 35. FIG. 3 shows the protuberances 48 having a length spanning along the entire ported surface of the cage 32. The protuberances 48 preferably have a length which at least spans the diameter of the secondary flow ports 35. The protuberances 48 preferably have inwardly tapered side walls 54 which assist in guiding the passage of fluid streams and minimizing the generation of destructive eddy currents which arise when fluid streams collide head on. Protuberances 48 thus provide the dual advantages of resisting erosion and extending the service life of the tubular liner 50 of the insert cartridge 30.

FIG. 5 is a view similar to FIG. 4, with arrows fancifully indicating the flow pattern of the fluid streams. Fluid streams move through the inlet bore 18, and enter the cage 32 through the main flow ports 34. As the fluid streams flow through the sections of the annulus 52, they are deflected inwardly by the protuberances 48, thereby converging together angularly instead of head-on. Since the protuberances 48 are positioned substantially in alignment, or preferably in direct alignment, with the secondary flow ports 35, the fluid streams are deflected inwardly to enter the cage 32 through the secondary flow ports 35, thereby avoiding erosional wear of the inner circumferential surface of the tubular structure 50.

All publications mentioned in this specification are indicative of the level of skill in the art of this invention. All publications are herein incorporated by reference to the same extent as if each publication was specifically and individually indicated to be incorporated by reference.

The terms and expressions in this specification are, unless otherwise specifically defined herein, used as terms of description and not of limitation. There is no intention, in using such terms and expressions, of excluding equivalents of the features illustrated and described, it being recognized that the scope of the invention is defined and limited only by the claims which follow.

The invention claimed is:

1. A choke valve having a fluid flow path extending therethrough which is to be restricted or closed, comprising:
   a hollow valve body assembly having an inlet bore and an outlet bore substantially at right angles, and a main bore which is an extension of the outlet bore and which communicates with the inlet bore;
   a tubular sleeve having a side wall positioned in the main bore across the inlet bore and forming only one pair of diametrically opposed side ports communicating with the inlet bore, the side ports being located to overlap the intersection of the centre axes of the inlet and outlet bores, and such that an axis through a midpoint of the side ports is offset relative to the centre axis of the inlet bore so that direct impingement of fluid along the centre axis of the inlet bore is on the side wall of the tubular sleeve;
   a flow trim within the tubular sleeve comprising a stationary tubular cage aligned with the body outlet, and a flow collar or plug slidable along the side wall of the cage, the cage side wall forming an internal bore aligned with the outlet bore and at least one pair of diametrically opposed main flow ports located to overlap the intersection of the centre axes of the inlet and outlet bores, one pair of the at least one pair of main flow ports being aligned with the side ports of the tubular sleeve to communicate directly with the side ports, whereby fluid may enter the choke valve through the inlet bore and pass through the main flow ports at reduced pressure and continue through the outlet bore;
   a bonnet connected with and closing the upper end of the tubular sleeve and the body, the bonnet being disengagably connected with the body; and
   a stem for biasing the flow collar or plug over the main flow ports.

2. The choke valve of claim 1, wherein:
   the inlet bore and outlet bore are arranged in a T-shape to provide a body side inlet, a body outlet and an insert chamber at the intersection of the inlet and outlet; and
   the tubular sleeve and the flow trim are arranged as a removable insert assembly positioned in the insert chamber, the insert assembly comprising:
   i. a tubular cartridge having a side wall forming an internal bore and a pair of diametrically opposed side ports communicating with the body inlet, whereby fluid enters through the side ports from the body inlet, the side ports being located to overlap the intersection of the centre axes of the body inlet and the body outlet, and such that the axis through a midpoint of the side ports is offset relative to the centre axis of the body inlet so that direct impingement by fluid moving along the centre inlet axis is on the side wall of the tubular cartridge;
   ii. the flow trim positioned in the cartridge internal bore, the flow trim comprising the tubular cage aligned with the body outlet, and the flow collar or plug slidable along the side wall of the cage, the cage side wall forming the at least one pair of diametrically opposed main flow ports located to overlap the intersection of the centre axes of the inlet and outlet, and one pair of the at least one pair of main flow ports being aligned with the side ports of the tubular cartridge to communicate directly with the side ports, whereby fluid from the inlet may enter the cage bore at reduced pressure and pass through the outlet;
   iii. the bonnet connected with and closing the upper end of the tubular cartridge and the body, the bonnet being disengagably connected with the body; and iv. the stem for biasing the flow collar or plug over the main flow ports.

3. The choke valve of claim 2, wherein the insert chamber is diametrically enlarged to reduce the flow velocity of fluid compared to that in the inlet.

4. The choke valve of claim 3, further comprising
   at least a pair of diametrically opposed secondary flow ports formed in the side wall of the cage, the secondary flow ports having a smaller diameter than that of the main flow ports and each pair of secondary flow ports being positioned with an axis which is offset by 90° from the axis of the main flow ports and closer to the body outlet than are the main flow ports; and
   protuberances extending inwardly into the internal bore of the tubular cartridge from the side wall of the tubular cartridge and being aligned with each of the secondary flow ports, so that fluid moving through an annulus formed between the flow trim and the tubular cartridge is deflected inwardly by the protuberances to enter the cage through the secondary flow ports.

5. The choke valve of claim 4, comprising only one pair of main flow ports and only one pair of secondary flow ports, and the side ports of the tubular cartridge being positioned with an axis which is offset by 90° relative to the centre axis of the inlet.

6. The choke valve of claim 5, wherein the flow trim includes the flow collar.

7. The choke valve of claim 6, wherein the protuberances are of a length which at least spans the diameter of the secondary flow ports, and have inwardly tapered side walls.

8. The choke valve of claim 1, wherein the main bore is diametrically enlarged to reduce the flow velocity of fluid compared to that in the inlet bore.

9. The choke valve of claim 8, further comprising
   at least a pair of diametrically opposed secondary flow ports formed in the side wall of the cage, the secondary flow ports having a smaller diameter than that of the main flow ports and each pair of secondary flow ports being positioned with an axis which is offset by 90° from the axis of the main flow ports and closer to the body outlet than are the main flow ports; and
   protuberances extending inwardly into the internal bore of the tubular sleeve from the side wall of the tubular sleeve and being aligned with each of the secondary flow ports, so that fluid moving through an annulus formed between the flow trim and the tubular sleeve is deflected inwardly by the protuberances to enter the cage through the secondary flow ports.

10. The choke valve of claim 9, comprising only one pair of main flow ports and only one pair of secondary flow ports, and the side ports of the tubular sleeve being positioned with an axis which is offset by 90° relative to the centre axis of the inlet.

11. The choke valve of claim 10, wherein the flow trim includes the flow collar.

12. The choke valve of claim 11, wherein the protuberances are of a length which at least spans the diameter of the secondary flow ports, and have inwardly tapered side walls.

13. The removable insert assembly as set forth in claim 2.

\* \* \* \* \*